(12) United States Patent
Kim

(10) Patent No.: US 11,332,139 B2
(45) Date of Patent: May 17, 2022

(54) SYSTEM AND METHOD OF CONTROLLING OPERATION OF AUTONOMOUS VEHICLE

(71) Applicants: Hyundai Motor Company, Seoul (KR); Kia Motors Corporation, Seoul (KR)

(72) Inventor: In-Su Kim, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 60 days.

(21) Appl. No.: 16/867,220

(22) Filed: May 5, 2020

(65) Prior Publication Data

US 2021/0179111 A1 Jun. 17, 2021

(30) Foreign Application Priority Data

Dec. 16, 2019 (KR) .......................... 10-2019-0167687

(51) Int. Cl.
| | |
|---|---|
| *B60W 30/00* | (2006.01) |
| *B60W 30/18* | (2012.01) |
| *B60W 30/16* | (2020.01) |
| *B60W 60/00* | (2020.01) |
| *B60W 10/18* | (2012.01) |

(52) U.S. Cl.
CPC ...... *B60W 30/18127* (2013.01); *B60W 10/18* (2013.01); *B60W 30/162* (2013.01); *B60W 60/0016* (2020.02); *B60W 2520/105* (2013.01); *B60W 2554/4045* (2020.02); *B60W 2554/80* (2020.02); *B60W 2556/45* (2020.02)

(58) Field of Classification Search
None
See application file for complete search history.

(56) References Cited

U.S. PATENT DOCUMENTS

| | | | |
|---|---|---|---|
| 8,229,663 B2* | 7/2012 | Zeng ..................... | G01S 5/0072 340/995.25 |
| 9,147,353 B1* | 9/2015 | Slusar .................. | G08G 1/0129 |
| 9,487,212 B1* | 11/2016 | Adam ................... | B60W 30/16 |
| 10,089,876 B1* | 10/2018 | Ramasamy .......... | G05D 1/0231 |
| 10,239,526 B2 | 3/2019 | Durgin et al. | |
| 10,304,333 B2* | 5/2019 | Engel .................... | H04W 4/029 |
| 10,449,967 B1* | 10/2019 | Ferguson .............. | H04L 67/306 |
| 10,621,869 B2* | 4/2020 | Yamamoto ............... | G08G 1/09 |

(Continued)

*Primary Examiner* — Jonathan M Dager
(74) *Attorney, Agent, or Firm* — Mintz Levin Cohn Ferris Glovsky and Popeo, P.C.; Peter F. Corless

(57) ABSTRACT

A system and a method of controlling an operation of an autonomous vehicle are provided. The method includes receiving, by the autonomous vehicle, information about neighboring vehicles and estimating a lane change intention of a first vehicle of the neighboring vehicles in a next lane in a front direction of the autonomous vehicle through the input information. Whether to allow the first vehicle to change a lane in consideration of acceleration/deceleration of the autonomous vehicle and whether a safe distance between the autonomous vehicle and the neighboring vehicles is secured is determined. An acceleration/deceleration control signal is generated for adjusting a traveling speed of the traveling vehicle and regenerative braking force and friction braking force of the autonomous vehicle is distributed according to the acceleration/deceleration control signal to perform braking.

6 Claims, 7 Drawing Sheets

(56) References Cited

U.S. PATENT DOCUMENTS

| | | | |
|---|---|---|---|
| 10,757,485 B2* | 8/2020 | Al-Stouhi | H04W 4/46 |
| 2012/0265431 A1* | 10/2012 | Hayakawa | B60W 10/18 |
| | | | 701/301 |
| 2013/0090822 A1* | 4/2013 | Schwindt | B60T 7/22 |
| | | | 701/70 |
| 2014/0195072 A1* | 7/2014 | Graumann | G08G 1/22 |
| | | | 455/66.1 |
| 2015/0145694 A1* | 5/2015 | Dupont | B60Q 1/34 |
| | | | 340/903 |
| 2015/0194055 A1* | 7/2015 | Maass | G08G 1/163 |
| | | | 340/905 |
| 2016/0277513 A1* | 9/2016 | Kim | H04L 67/1044 |
| 2016/0304097 A1* | 10/2016 | Taira | B60W 10/20 |
| 2017/0287331 A1* | 10/2017 | Laur | B62D 15/0285 |
| 2017/0341652 A1* | 11/2017 | Sugawara | G08G 1/166 |
| 2018/0046196 A1* | 2/2018 | Hashimoto | B60W 30/143 |
| 2018/0068191 A1* | 3/2018 | Biemer | G06T 7/11 |
| 2018/0079419 A1* | 3/2018 | Yamamoto | G05D 1/0027 |
| 2018/0126985 A1* | 5/2018 | Lee | G08G 1/0962 |
| 2018/0188735 A1* | 7/2018 | Sugawara | G06V 20/58 |
| 2018/0215389 A1* | 8/2018 | Takae | B60R 21/0134 |
| 2018/0222423 A1* | 8/2018 | Takae | G06V 20/588 |
| 2018/0257615 A1 | 9/2018 | Rawashdeh et al. | |
| 2018/0319403 A1* | 11/2018 | Buburuzan | G05D 1/0088 |
| 2018/0339708 A1* | 11/2018 | Geller | B60L 3/0015 |
| 2019/0043364 A1* | 2/2019 | Jumpertz | G08G 1/0965 |
| 2019/0088138 A1* | 3/2019 | Kang | B60W 10/04 |
| 2019/0098471 A1* | 3/2019 | Rech | G08G 1/162 |
| 2019/0193737 A1* | 6/2019 | Likhachev | G05D 1/0289 |
| 2020/0108869 A1* | 4/2020 | You | G07C 5/0866 |
| 2021/0031800 A1* | 2/2021 | Fuchs | B60W 60/0027 |
| 2021/0034063 A1* | 2/2021 | Oguro | B60W 30/09 |
| 2021/0074162 A1* | 3/2021 | Jafari Tafti | B62D 15/025 |
| 2021/0078603 A1* | 3/2021 | Nakhaei Sarvedani | G06V 20/588 |
| 2021/0269040 A1* | 9/2021 | Kurokawa | G08G 1/096708 |
| 2021/0291732 A1* | 9/2021 | Woo | B60Q 5/005 |

* cited by examiner

SYSTEM AND METHOD OF CONTROLLING OPERATION OF AUTONOMOUS VEHICLE

CROSS-REFERENCE TO RELATED APPLICATIONS

This application claims priority under 35 U.S.C. § 119 to Korean Patent Application No. 10-2019-0167687, filed on Dec. 16, 2019, the disclosure of which is incorporated herein by reference in its entirety.

BACKGROUND

1. Field of the Disclosure

The present disclosure relates to a system and a method of controlling an operation of an autonomous vehicle, and more particularly, to a system and a method which preemptively predicts a braking requirement time to secure a safe distance between vehicles when a vehicle changes a lane based on information regarding neighboring vehicles of a traveling vehicle, thereby controlling regenerative braking to be maximized and friction braking to be minimized.

2. Description of the Related Art

An autonomous vehicle refers to a vehicle capable of traveling autonomously to a set destination by collecting external information, recognizing a neighboring traffic condition, and establishing a traveling plan within an operation of a driver. The autonomous vehicle is a transportation device in which most advanced technologies, such as high-tech sensors configured to detect objects while the vehicle is being driven, network communication configured to transmit information, and an artificial intelligence control system configured receive various collected data and processing and determining the received data in real time, are converged. The autonomous vehicle is configured to receive and process information, such as traffic information, a road construction, and traffic accident information, as well as map information, generated on a road to a traveling destination in real time. Further, the technology in the form of mutually transceiving information with neighboring vehicles has been developed. When the information is used, a driver may preemptively recognize the danger of the vehicle before driving and safely drive.

Recently, as domestic and foreign companies actively develop technologies, interest in autonomous vehicle related technology is increasing. The autonomous vehicle needs to take an appropriate action through the recognition and the determination of various traveling situations, and a change in a lane in the various traveling situations is one of the most common and important traveling situations directly connected with driver's safety. Accordingly, it is important to implement the autonomous vehicle to guarantee safety when neighboring vehicles of the autonomous vehicle change lanes, and there is a need for a method of reducing traffic accidents through the implementation.

In the meantime, a developed technique controls cruise for improving fuel efficiency, and more particularly, controls cruise for improving fuel efficiency, which determines a traveling speed for fuel efficiency based on a traffic signal information state (e.g., red/green/yellow signals) and a time at which a traffic light is changed to red based on information regarding a distance to a front vehicle and the like, turns off starting for improving fuel efficiency, and determines regenerative braking and friction braking operation.

Another developed technique provides a braking method of an autonomous vehicle, and more particularly, a braking method of an autonomous vehicle which controls a vehicle with a comfortable deceleration at an initial stage based on traffic signal information (e.g., red signal) and operates the vehicle with an automatic emergency braking deceleration when additional braking is required, and compares traffic signal information with image information of a signal camera to check reliability.

Yet another developed technique provides a method of operating an optical deceleration by using regenerative braking, and more particularly, a method of operating an optical deceleration by using regenerative braking, which operates a vehicle with a deceleration, at which the vehicle may be decelerated without friction braking, and a vehicle speed by maximally operating regenerative braking from a vehicle speed of a front vehicle and distance information.

According to the developed techniques regenerative braking is adjusted to have maximum fuel efficiency from a state of a traffic light (e.g., red/green/yellow), a speed of a front vehicle, and a distance between a subject vehicle and a front vehicle to perform deceleration. In other words, a braking time is determined based on an interval to a front vehicle of a traveling vehicle, a traffic light state (e.g., red/green/yellow), and a time at which a traffic light state is changed.

Additionally, in the developed techniques, only the information regarding the vehicle (that is, the first front vehicle) in front of the subject vehicle is used, therefore, when a substantial interval exists between the subject vehicle and the first front vehicle, the subject vehicle may travel at a high speed. However, when a vehicle traveling in the lane next to the subject vehicle changes a lane in front of the subject vehicle to obstruct the course, the subject vehicle needs to simultaneously operate regenerative braking and friction braking to maintain a safe distance from the obstructing vehicle.

In particular, the friction braking needs to be operated at the same time, and thus, fuel efficiency improvement is minimal and sudden braking causes a dangerous situation for a driver who is unaware of the driving situation or a situation that causes motion sickness due to vehicle behavior. In the autonomous vehicle, passengers may freely read, sleep, watch movies, or stand without looking ahead or in the driving direction of the vehicle, and therefore, sudden braking causes a danger to the passengers, and thus the risk needs to be reduced by preemptively braking as much as possible.

Accordingly, there is a need for a method of improving fuel efficiency and simultaneously maintaining a safe distance with an interrupted vehicle by receiving a signal notifying a change in lanes by vehicles in the next lane, steering wheel operation signals of vehicles traveling in the next lane, and the like based on Vehicle-to-Vehicle (V2V) communication before the vehicles traveling in the next lane based on a subject vehicle interrupt traveling of the subject vehicle by the change in lane and preemptively performing, by the subject vehicle, deceleration only with regenerative braking.

SUMMARY

According to an aspect of the present disclosure, an object of the present disclosure is to secure safe distance between vehicles and improve fuel efficiency by minimizing friction braking (e.g., sudden braking) and maximizing regenerative braking by preemptively operating regenerative braking before vehicles in the next lane cuts in based on information regarding the vehicle traveling in the next lane of a subject vehicle, in addition to information regarding a traffic light and a front vehicle of the subject vehicle. The present disclosure is a defensive driving technology that prevents a collision by preemptively predicting a braking requirement time when a vehicle in a next lane cuts in and performs braking only with regenerative braking to reduce danger of an accident of an autonomous vehicle.

An exemplary embodiment of the present disclosure provides a system for controlling an operation of an autonomous vehicle that may include: an information input unit configured to receive information regarding neighboring vehicles of a traveling vehicle; an autonomous driving controller configured to estimate a lane change intention of a vehicle in a next lane in a front direction of the traveling vehicle from a signal received from the information input unit, determine whether to allow the vehicle in the next lane in the front direction to change a lane based on acceleration/deceleration of the traveling vehicle and whether a safe distance between the traveling vehicle and the neighboring vehicles is secured, and generate an acceleration/deceleration control signal for adjusting a traveling speed of the traveling vehicle; and a braking unit configured to distribute regenerative braking force and friction braking force of the traveling vehicle based on the acceleration/deceleration control signal received from the autonomous driving controller to perform braking.

The information input unit may be configured to receive information using one or more of Internet Of Things (IOT), Vehicle-to-Vehicle (V2V), a radar sensor, a lidar sensor, an ultraviolet sensor, a camera, and a navigation system. The autonomous driving controller may be configured to output a lane change allowance or prohibition signal to the vehicle in the next lane in the front direction based on the allowance/disallowance of the change in the lane of the vehicle in the next lane in the front direction.

When the lane change intention of the vehicle in the next lane in the front direction is estimated even though the lane change prohibition signal is output to the vehicle in the next lane in the front direction, the autonomous driving controller may be configured to generate a deceleration control signal to maximally perform regenerative braking, but friction braking is performed at the same time as necessary. The braking unit may be configured to calculate a deceleration based on a vehicle speed of the traveling vehicle in consideration of total brake force of regenerative braking force and friction braking force and distribute the regenerative braking force and the friction braking force of the traveling vehicle.

Another exemplary embodiment of the present disclosure provides a method of controlling an operation of an autonomous vehicle that may include: receiving, by an autonomous vehicle, information regarding neighboring vehicles; estimating a lane change intention of a vehicle in a next lane in a front direction of the traveling vehicle through the input information, determining whether to allow the vehicle in the next lane in the front direction to change a lane based on acceleration/deceleration of the traveling vehicle and whether a safe distance between the traveling vehicle and the neighboring vehicles is secured, and generating an acceleration/deceleration control signal for adjusting a traveling speed of the traveling vehicle; and distributing regenerative braking force and friction braking force of the traveling vehicle based on the acceleration/deceleration control signal to perform braking.

The receiving of the information may include receiving information using one or more of Internet Of Things (TOT), Vehicle-to-Vehicle (V2V), a radar sensor, a lidar sensor, an ultraviolet sensor, a camera, and a navigation system of the autonomous vehicle. A lane change allowance or prohibition signal may be output to the vehicle in the next lane in the front direction based on the allowance/disallowance of the change in the lane of the vehicle in the next lane in the front direction.

When the lane change intention of the vehicle in the next lane in the front direction is estimated even though the lane change prohibition signal is output to the vehicle in the next lane in the front direction, the generating of the acceleration/deceleration control signal may include generating a deceleration control signal to maximally perform regenerative braking, but friction braking is performed at the same time as necessary. The performing of the braking may include calculating a deceleration according to the maximum vehicle speed based on total brake force of regenerative braking force and friction braking force and distributing the regenerative braking force and the friction braking force of the traveling vehicle.

The present disclosure including the foregoing configuration has advantages described below.

First, a vehicle may preemptively decelerate in a regenerative braking section, that is, regenerative braking may be maximized and friction braking (e.g., sudden braking) may be minimized, by recognizing a lane change intention of the vehicle traveling in a next lane of a subject vehicle in advance, thereby improving fuel efficiency.

Second, it may be possible to prevent a collision by safely braking a vehicle without sudden braking, and enable the vehicle to safely travel by disallowing a change in a lane of a vehicle in a next lane in advance while the subject vehicle is accelerating.

BRIEF DESCRIPTION OF THE DRAWINGS

The above and other objects, features and advantages of the present disclosure will be more clearly understood from the following detailed description taken in conjunction with the accompanying drawings, in which.

DETAILED DESCRIPTION

Figure 1:
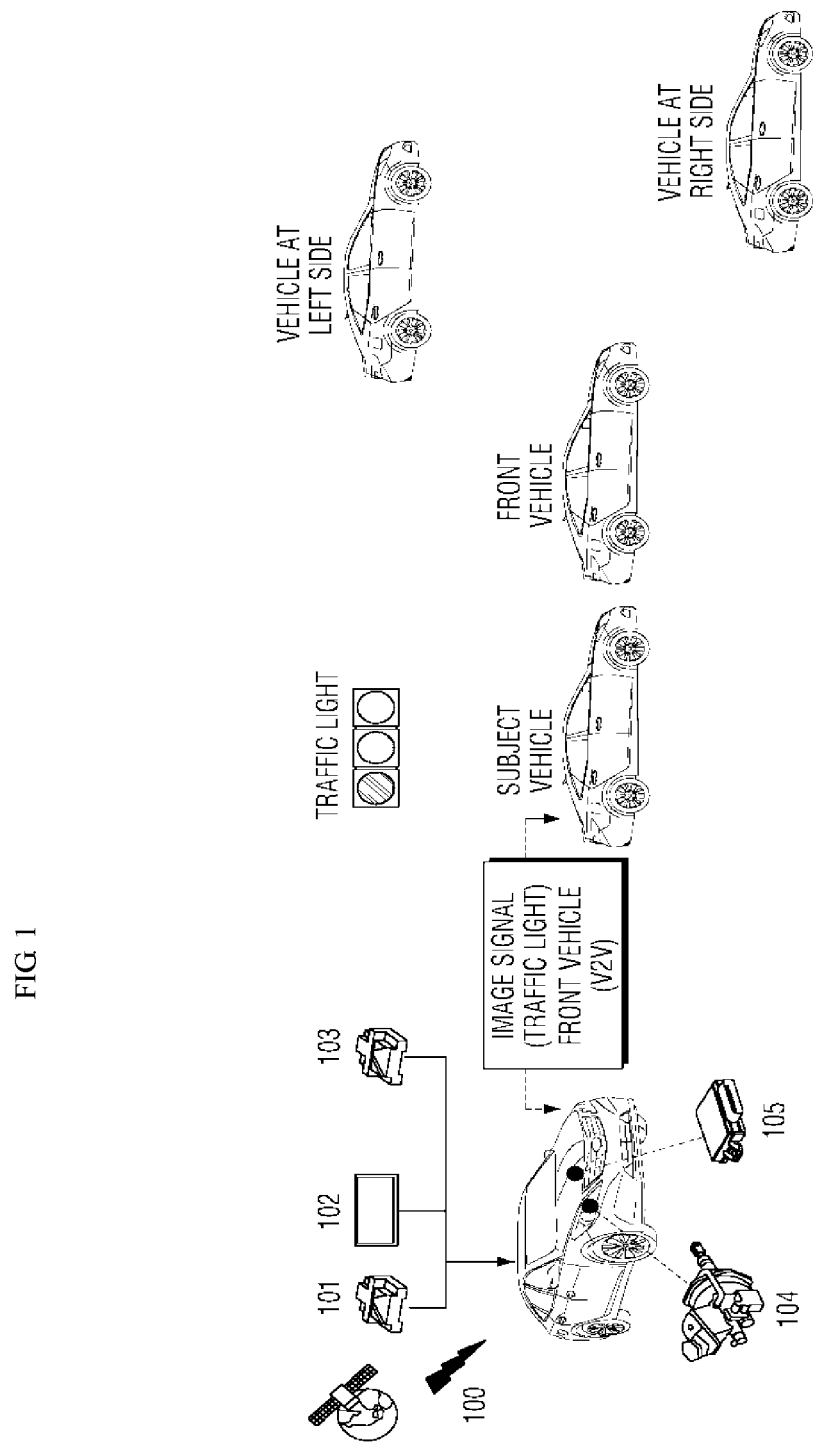
FIG. 1 is a diagram illustrating an entire system configuration including an autonomous vehicle and neighboring vehicles according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, the present disclosure will be described in detail with reference to the contents described in the accompanying drawings. However, the present disclosure is not restricted or limited by exemplary embodiments. Like reference numerals suggested in each drawing designate members which perform substantially the same functions.

The object and the effect of the present disclosure will be naturally understood or more clear by the description below, and the object and the effect of the present disclosure are not limited only by the description below. In describing the present disclosure, a detailed explanation of a publicly known technology related to the present disclosure may be omitted so as to avoid unnecessarily obscuring the subject matter of the present disclosure.

The present disclosure suggests a method of improving fuel efficiency by minimizing friction braking and maximally using regenerative braking by receiving a steering change signal of a vehicle in a next lane and the like when the vehicle in the next lane of a subject vehicle cuts in the front side of the subject vehicle (e.g., changes into the subject vehicle's lane at an unsafe distance) or a front vehicle decreases a vehicle speed for changing a lane. Further, the present disclosure also suggests a method of providing a warning so that neighboring vehicles perform defensive driving by notifying the neighboring vehicles of acceleration of a subject vehicle.

FIG. 1 is a diagram illustrating an entire system configuration including an autonomous vehicle and neighboring vehicles according to an exemplary embodiment of the present disclosure. As illustrated in FIG. 1, an autonomous vehicle (subject vehicle) uses IOT/V2V (communication technology between vehicles) 100, a camera 101 (or other imaging device), a navigation system 102, a radar/lidar sensor 103, an ultraviolet sensor, and the like for collecting information regarding various neighboring vehicles (e.g., surrounding vehicles such as front vehicles, left side vehicles, right side vehicle, and the like). An autonomous driving controller 105 of the autonomous vehicle (e.g., subject vehicle) enables the autonomous vehicle (subject vehicle) to preemptively brake to secure a safe distance between the vehicles (e.g., the subject vehicle and surrounding vehicles) based on movements of various vehicles (e.g., the left side vehicle, the right side vehicle, and the like) in the next or adjacent lane from the information collected in real time, a change in a vehicle speed by the subject vehicle for changing a lane, and the like. Additionally, a brake electronic control unit (ECU) 104 of the autonomous vehicle (subject vehicle) may be configured to perform braking by distributing regenerative braking force and friction braking force based on a braking time point and braking requirement deceleration.

Figure 2:
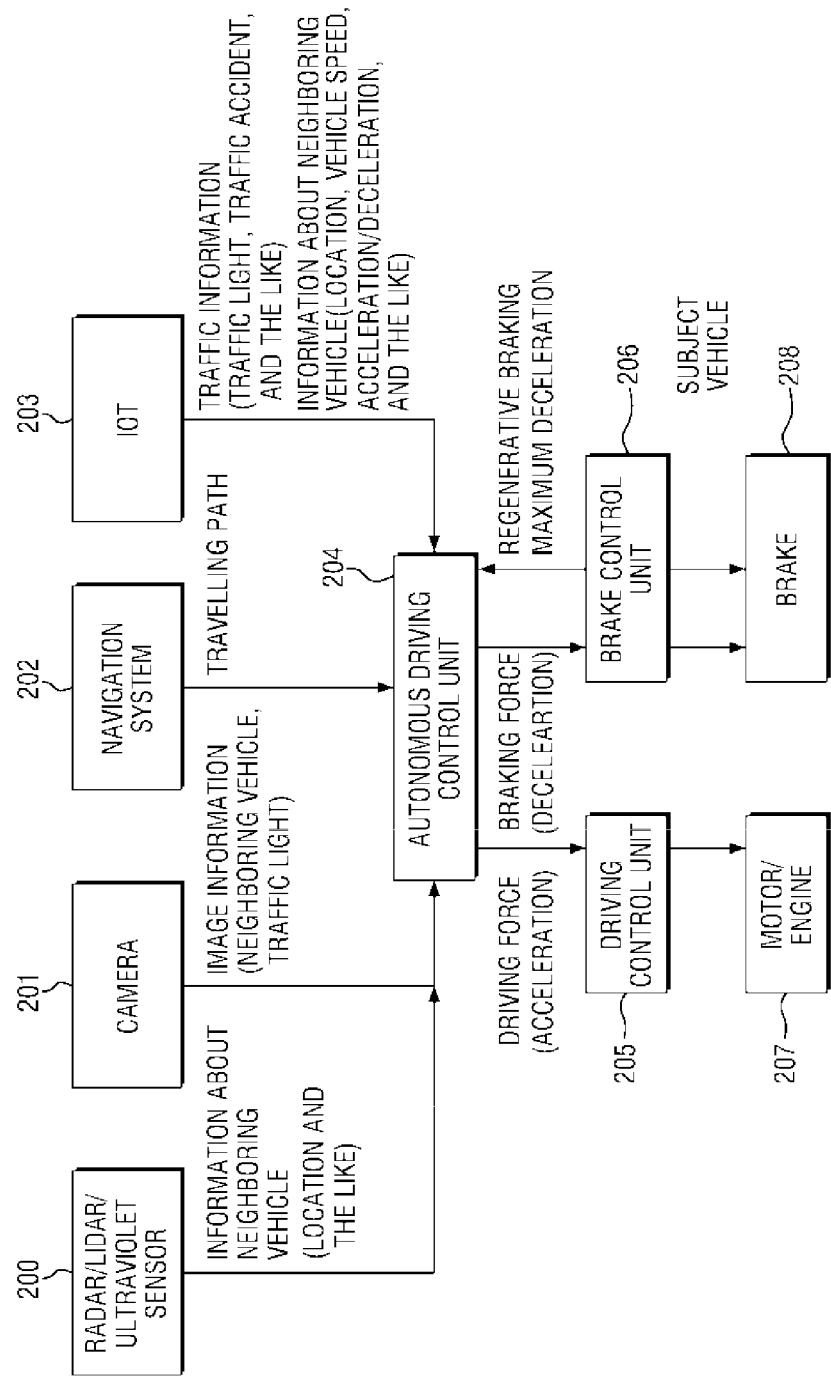
FIG. 2 is a schematic diagram illustrating a system architecture of the autonomous vehicle according to the exemplary embodiment of the present disclosure.

FIG. 2 is a schematic diagram illustrating a system architecture of the autonomous vehicle according to the exemplary embodiment of the present disclosure. Referring to FIG. 2, the autonomous vehicle according to the exemplary embodiment of the present disclosure may include an information input unit including a radar/LIDAR/ultraviolet sensor 200, a camera 201, a navigation system 202, and an IOT/V2V 203, a braking unit including an autonomous driving controller 204, a brake controller 206, and a brake 208, and a driving unit including a driving controller 205 and a motor/engine 207.

The information input units 200, 201, 202, and 203 may be configured to receive information regarding the neighboring vehicles of a traveling vehicle, and transmit various information based on communication with the outside while the subject vehicle is being driven using network communication, sensors mounted on the vehicle, and the like. The IOT/V2V 203 that is the information input unit may be configured to receive map information, traffic information (e.g., a traffic light, a road construction, a traffic accident, and the like) to a traveling destination, information regarding neighboring vehicles (e.g., locations, vehicle speeds, braking/acceleration, acceleration/deceleration, and the like of the surrounding vehicles) using a wireless network. In relation to this, a connected vehicle may be configured to transmit various information with the outside connected in both directions via a wireless network inside and outside the vehicle using TOT, V2V, and the like during traveling, and the connected vehicle to which an Information Technology (IT) is applied is controllable while transceiving data with multiple vehicles.

Through the data, traffic information according to a lane, predicted traffic volume by time zone, an optimal route, a location of the vehicle, a location of a relative vehicle, a destination, and the like may be shared in real time, and various information, such as a vehicle warning light, a vehicle state, and a traffic system, may also be shared. The connected vehicle technology is already commercially available, and the present disclosure enables the transmission and reception of necessary data between vehicles when each vehicle is connected to the network by the technology.

The vehicle sensor that is another information input unit may include various sensors, for example, the radar/lidar/ ultraviolet sensor 200 and the camera 201, which are mounted on the subject vehicle and configured to detect objects, and the vehicle may be configured to detect locations of neighboring vehicles, a speed and an acceleration/ deceleration, and a traffic light color (e.g., green/yellow/red) using the sensors. The radar/LIDAR/ultraviolet sensor 200 may be configured to detect neighboring vehicle information, such as locations, and transfer the detected neighboring vehicle information to the autonomous driving controller 204, and the camera 201 may be configured to detect image information, such as neighboring vehicles and a traffic light, and transfer the recognized image information to the autonomous driving controller 204.

The autonomous driving controller 204 may be configured to estimate traffic flow of neighboring vehicles and determine whether it is possible to secure a safe distance between the subject vehicle and the neighboring vehicles only with regenerative braking, and estimate a lane change intention of the vehicle in the next lane in a front direction of the subject vehicle by input signals from the information input units 200, 201, 202, and 203, and determine whether to allow the vehicle in the next lane in the front direction to change the lane (e.g., into the driving lane of the subject vehicle) based on acceleration/deceleration of the subject vehicle and whether the safe distance between the subject vehicle and the neighboring vehicles may be secured.

Herein, the safe distance may be the distance in a lane direction, and refers to a distance between the vehicle desiring to change a lane and a front vehicle in a target lane and a distance between the vehicle and a rear vehicle in the target lane. According to the determination, the autonomous driving controller 204 may be configured to adjust a traveling speed, and more particularly, the autonomous driving controller 204 may be configured to transfer a braking force (e.g., deceleration) control command to the braking units 206 and 208 and transfer a driving force (e.g., acceleration) control command to the driving units 205 and 207.

The braking units 206 and 208 may be configured to perform braking based on a strategy for distributing regenerative braking force and friction braking force of the current vehicle, and the brake controller (brake ECU) 206 that is the braking unit may be configured to predict an operation slope of friction braking force based on maximum regenerative braking force and a current brake state (e.g., degradation of performance of an actuator and the like) based on a battery charging state and the like. Further, the brake controller 206 may be configured to calculate a maximum vehicle speed and a deceleration based on total brake force of the regenerative braking force and the friction braking force, and calculate a maximum vehicle speed and a deceleration at which the vehicle is capable of traveling only with regenerative braking force and transfer the calculated maximum vehicle speed and deceleration to the autonomous driving controller 204.

Figure 3:
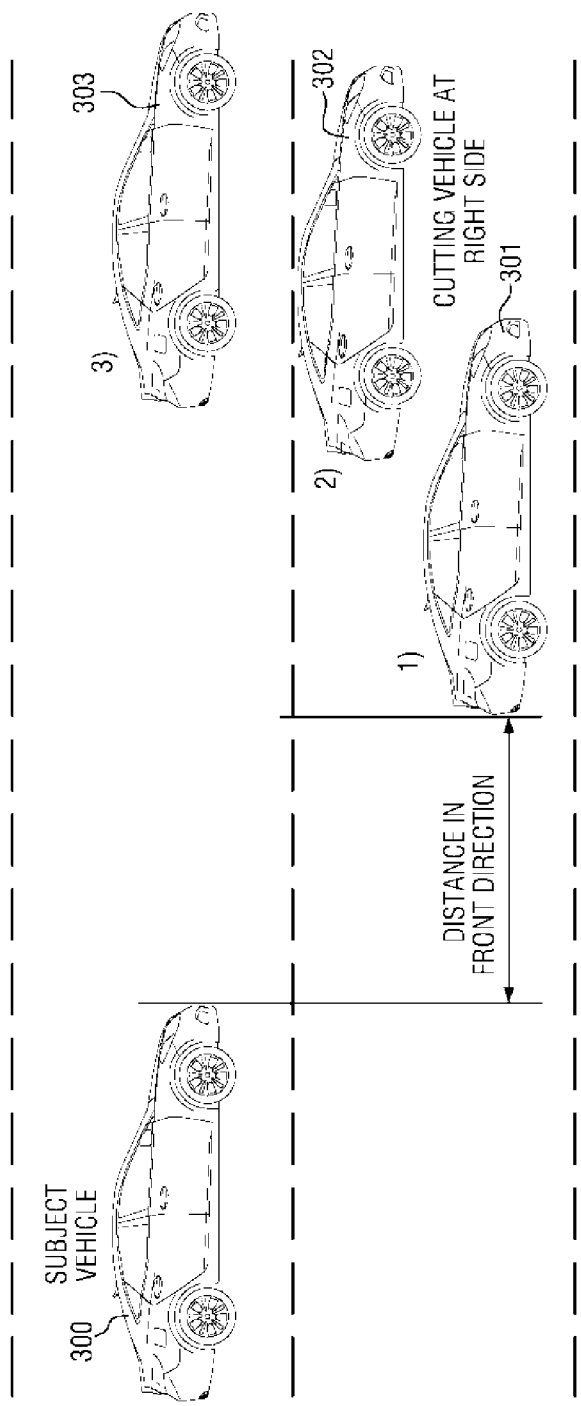
FIG. 3 is a configuration diagram for defining a lane change operation of a vehicle traveling in a lane next to the autonomous vehicle according to each stage according to the exemplary embodiment of the present disclosure.

FIG. 3 is a configuration diagram for defining a lane change operation of a vehicle traveling in a lane next to the autonomous vehicle according to each stage according to the exemplary embodiment of the present disclosure. As illustrated in FIG. 3, a stage in which a lane change intention of a vehicle 301 which is traveling in a lane next to a subject vehicle 300 is checked is referred to as a "first stage", a stage in which a vehicle 302 in a next lane approaches a traveling lane of the subject vehicle 300 is referred to as a "second stage", and a stage in which a vehicle 303 in a next lane cuts in the traveling lane of the subject vehicle is referred to as a "third stage".

In the first stage, a lane change intention of the vehicle 301 in the next lane of the subject vehicle 300 may be monitored using IOT information, a turn signal, and a steering wheel operation, a lane change allowance or prohibition signal may be transmitted to the vehicle 301 in the next lane based on a distance between the subject vehicle 300 and the vehicle 301 in the next lane, and whether to operate regenerative braking of the subject vehicle 300 may be determined.

In the second stage, an approach of the vehicle 302 in the next lane of the subject vehicle 300 to the lane may be detected from camera information, and when a front-directional distance between the subject vehicle 300 and the vehicle 302 in the next lane is within a predetermined distance, regenerative braking may be operated (e.g., low deceleration), and when an interval between the subject vehicle 300 and the vehicle 302 in the next lane is less than the predetermine distance or the vehicle 302 in the next lane decelerates, friction braking may be simultaneously operated for maintaining the interval between the vehicles.

In the third stage, the fact that the vehicle 303 in the next lane of the subject vehicle 300 cuts in the lane of the subject vehicle 300 may be detected from camera information, deceleration/acceleration, a current vehicle speed, IOT information, a radar/lidar sensor, and the like, and the subject vehicle 300 may be configured to operate using the existing braking method of the autonomous driving or the same method as that of the second stage.

Figure 4A:
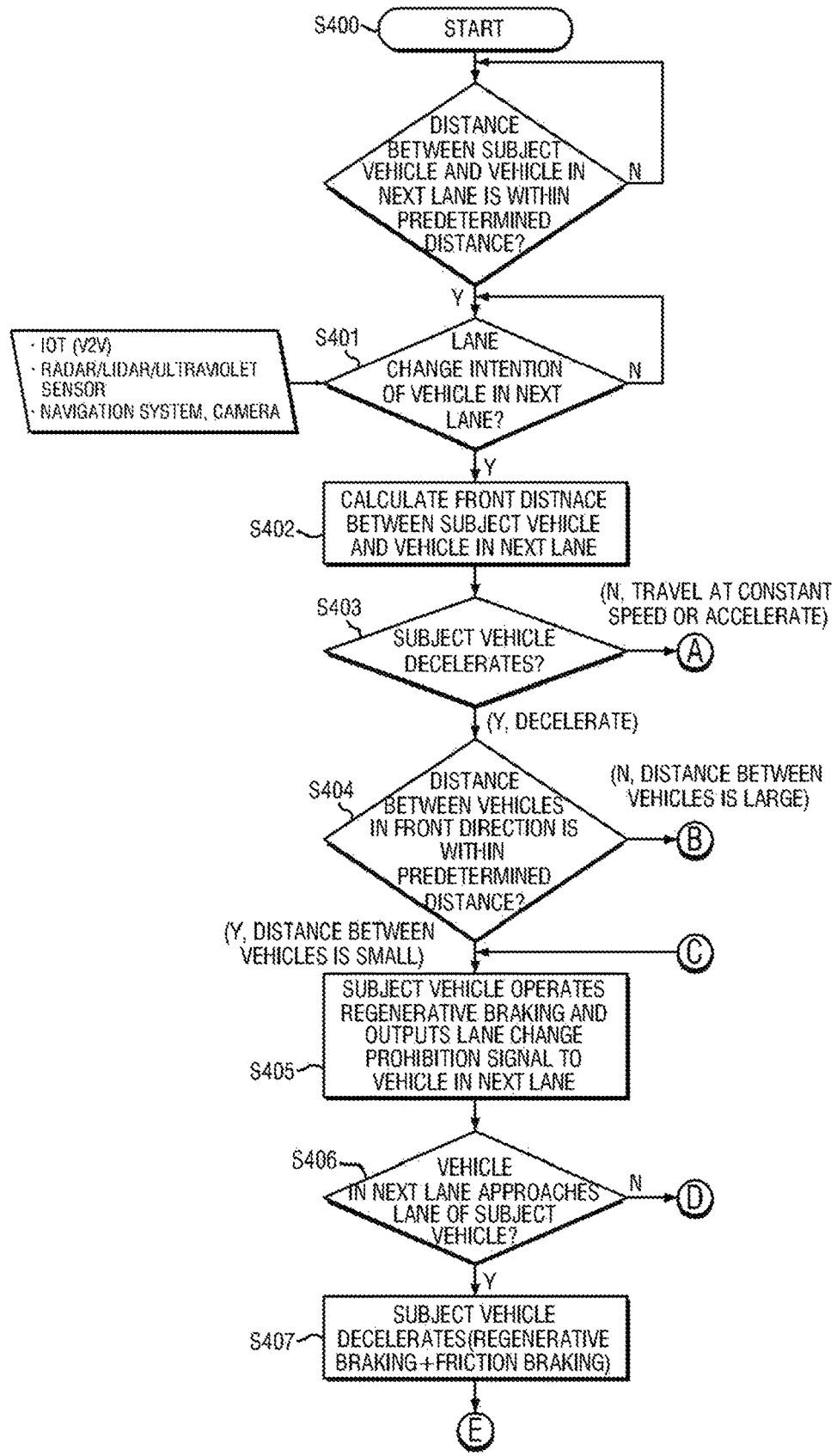
FIGS. 4A and 4B is a flowchart illustrating a method of controlling an autonomous driving operation of the subject vehicle when a vehicle in a next lane of the subject vehicle intends to change a lane according to the exemplary embodiment of the present disclosure.
Figure 4B:
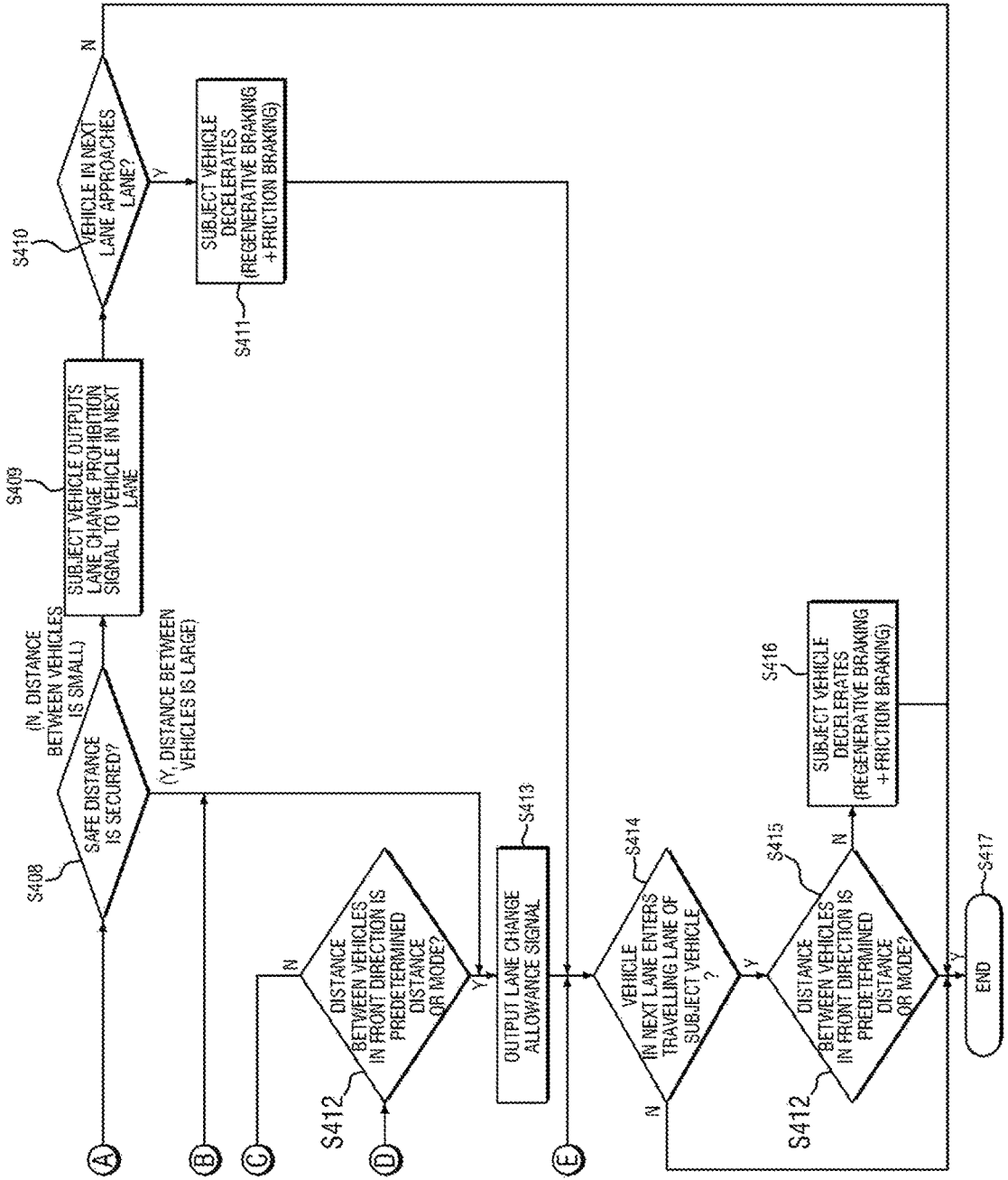

FIG. 4 is a flowchart illustrating a method of controlling an autonomous driving operation of the subject vehicle when a vehicle in a next lane of the subject vehicle intends to change a lane according to the exemplary embodiment of the present disclosure, and control logic according to the flowchart will be schematically described below. Notably, the method described herein below may be executed by a controller.

First, information regarding vehicles traveling in the next lane of the subject vehicle may be collected through input information using IOT and the like, and when a safe distance between the subject vehicle and the vehicle in the next lane is not secured when the vehicle in the next lane desires to change a lane in a front direction of the subject vehicle, the subject vehicle may be configured to operate regenerative braking and output a signal requesting a lane change prohibition to the vehicle in the next lane at the same time. In particular, when the subject vehicle is accelerating, the subject vehicle may be configured to request the lane change prohibition to the vehicle in the next lane while accelerating.

However, when the subject vehicle decelerates through the regenerative braking and a safe distance is secured, the subject vehicle may be configured to a lane change allowance signal to the vehicle in the next lane. In particular, when the vehicle in the next lane changes the lane without following the lane change prohibition signal, the subject vehicle may be configured to operate regenerative braking and friction braking at the same time when the vehicle in the next lane approaches the lane.

In the meantime, the vehicle in the next lane changes the lane according to the lane change allowance signal, and when wheels of the vehicle in the next lane approach the lane side from the center of the traveling lane, the deceleration of the subject vehicle may be determined based on an interval between the subject vehicle and the vehicle in the next lane, a deceleration and a speed of the vehicle in the next lane, and the like, to determine regenerative braking and friction braking according to a braking operation strategy. Further, when the vehicle in the next lane changes the lane and enters the lane in the traveling direction of the subject vehicle, the subject vehicle may be configured to operate braking to secure a safe distance between the vehicles according to an existing smart cruise control (SSC) and the like.

As described above, the subject vehicle may be configured to operate braking before the vehicle in the next lane changes the lane, and safely operate while establishing the IOT communication with the vehicle in the next lane, and the subject vehicle may be configured to reduce a speed by performing braking only with regenerative braking in advance, thereby minimizing friction braking and improving fuel efficiency. Hereinafter, each operation in the flowchart of FIG. 4 will be described in detail.

First, when the subject vehicle and a vehicle in a next lane are located within a predetermined distance, whether the vehicle in the next lane of the subject vehicle has a lane change intention may be determined using the radar/LIDAR/ultraviolet sensor, the camera, the navigation system, IOT/V2V, and the like in operation S401. In particular, information regarding multiple neighboring vehicles, as well as one vehicle in front of the subject vehicle, may be collected from the information input to the information input unit, such as the radar/lidar/ultraviolet sensor, the camera, the navigation system, and IOT/V2V, to consider and monitor movements of the neighboring vehicles. For example, a route of a road on which the subject vehicle is being driven and the neighboring vehicles may be detected using the navigation information, and the traveling lane of the subject vehicle may be monitored using the camera mounted on the subject vehicle.

In operation S401, a lane change intention of the vehicle that is traveling in the next lane may be checked from information, such as IOT information, a turn signal, and a steering signal, and in response to determining that the vehicle in the next lane has the lane change intention, a front distance between the subject vehicle and the vehicle in the next lane may be calculated in operation S402.

Additionally, whether the subject vehicle decelerates may be determined in operation S403, and in response to determining that the subject vehicle operates at a constant speed or acceleration without decelerating, whether a safe distance between the vehicles is secured may be checked in operation S408. In particular, when an interval between the vehicles is insufficient (e.g., less than a predetermined distance) causing the safe distance to not be secured, the subject vehicle may be configured to output a lane change prohibition signal to the vehicle in the next lane in operation S409. Then, whether the vehicle in the next lane approaches the lane may be determined using the camera of the subject vehicle and the like in operation S410, and in response to determining that the vehicle in the next lane approaches the lane, the subject vehicle may be configured to maximally operate regenerative braking since the vehicle in the next lane changes the lane in the state where the safe distance between the subject vehicle and the vehicle in the next lane is not secured.

Particularly, when the demanded deceleration is not satisfied, the demanded deceleration may be satisfied by performing friction braking at the same time in operation S411. Further, in operation S408, for example, even when a vehicle in front of the subject vehicle travels in a different lane or a different route, or the subject vehicle accelerates due to passing through a crosswalk, when the interval between the vehicles is sufficient and it is determined that the safe distance for changing the lane by the vehicle in the next lane is secured, the subject vehicles may be configured to output a lane change allowance signal in operation S413.

In the meantime, in response to determining that the subject vehicle decelerates in operation S403, whether a distance between the subject vehicle and the vehicle in the next lane in the front direction is within a predetermined distance may be determined in operation S404. In response to determining that the interval between the vehicles is sufficient and the safe distance is secured, the subject vehicle may be configured to output the lane change allowance signal in operation S413. However, when the interval between the vehicles is insufficient and the safe distance is not secured, the subject vehicle may be configured to operate regenerative braking for securing the safe distance and output a lane change prohibition signal to the vehicle in the next lane at the same time in operation S405.

Then, whether the vehicle in the next lane approaches the lane may be determined using the camera of the subject vehicle and the like in operation S406, and in response to determining that the vehicle in the next lane approaches the lane, the subject vehicle may be configured to maximally operate regenerative braking because the vehicle in the next lane changes the lane in the state where the safe distance between the subject vehicle and the vehicle in the next lane is not secured, and when a demanded deceleration is not satisfied, the subject vehicle may be configured to perform friction braking at the same time to satisfy the demanded deceleration in operation S407.

However, in response to determining that the vehicle in the next lane does not approach the lane in operation S406, operation S412 may be performed, and in response to determining that the distance between the vehicles in the front direction is less than the predetermined distance in operation S412, the subject vehicle may be configured to operate regenerative braking and output the lane change prohibition signal to the vehicle in the next lane at the same time in operation S405. In response to determining that the distance between the vehicles in the front direction is the predetermined distance or greater, the subject vehicle may be configured to output the lane change allowance signal in operation S413.

After the subject vehicle decelerates in operation S407 and S411 and the subject vehicle outputs the lane change allowance signal in operation S413, whether the vehicle in the next lane enters the traveling lane of the subject vehicle may be determined in operation S414. In particular, in response to determining that the vehicle in the next lane enters the traveling lane of the subject vehicle, whether a distance between the vehicles in the front direction is a predetermined distance or greater may be determined in operation S415. In response to determining that the distance between the vehicles in the front direction is the predetermined distance or greater, the subject vehicle may be configured to perform regenerative braking and decelerate and perform the friction braking at the same time as necessary in operation S416. However, in response to determining that the distance between the vehicles in the front direction is less than the predetermined distance in operation S415, that is, when the safe distance is secured, the subject vehicle does not perform braking.

Figure 5A:
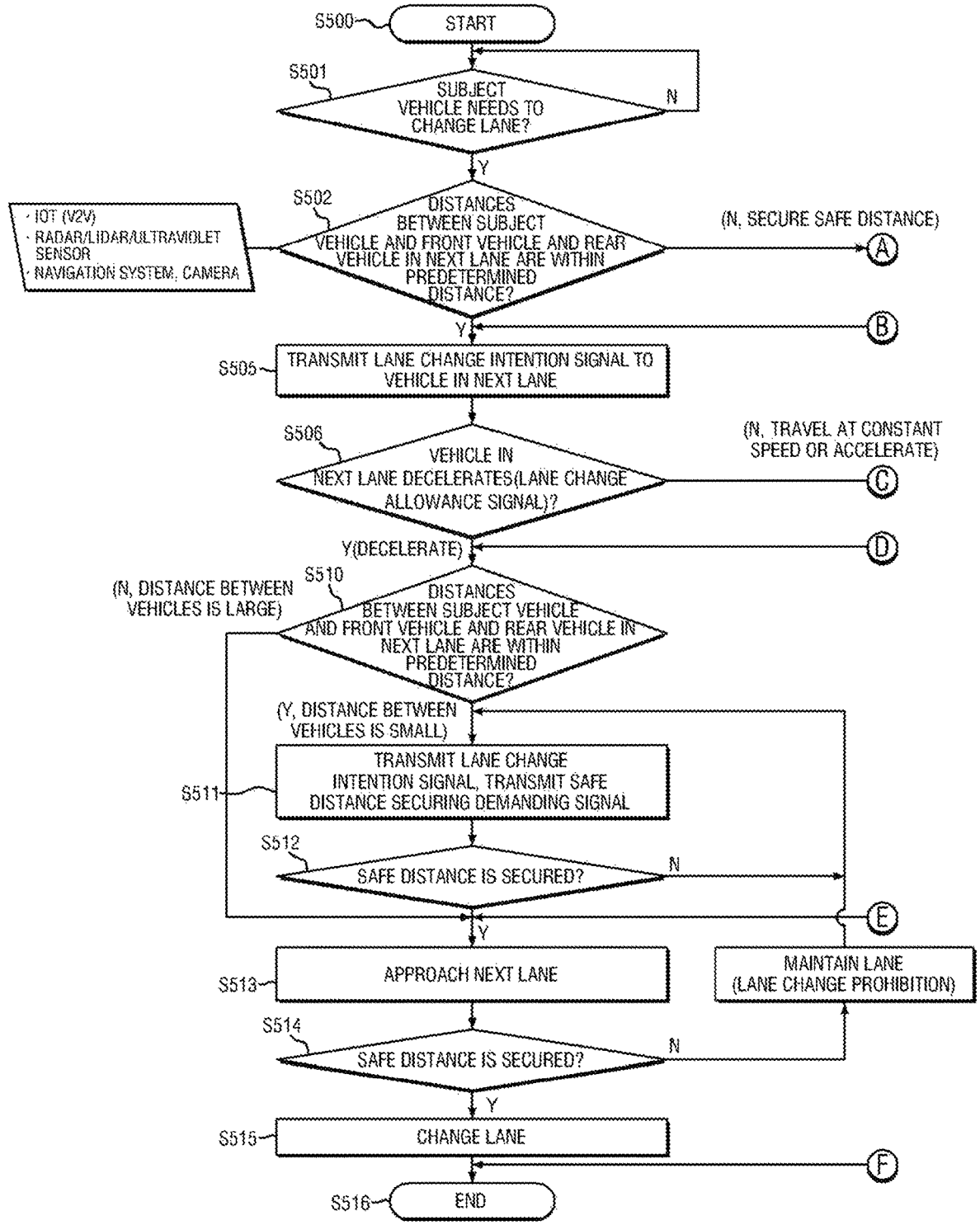
FIGS. 5A and 5B is a flowchart illustrating a method of controlling an autonomous driving operation of a subject vehicle when the subject vehicle intends to change a lane according to another exemplary embodiment of the present disclosure.
Figure 5B:
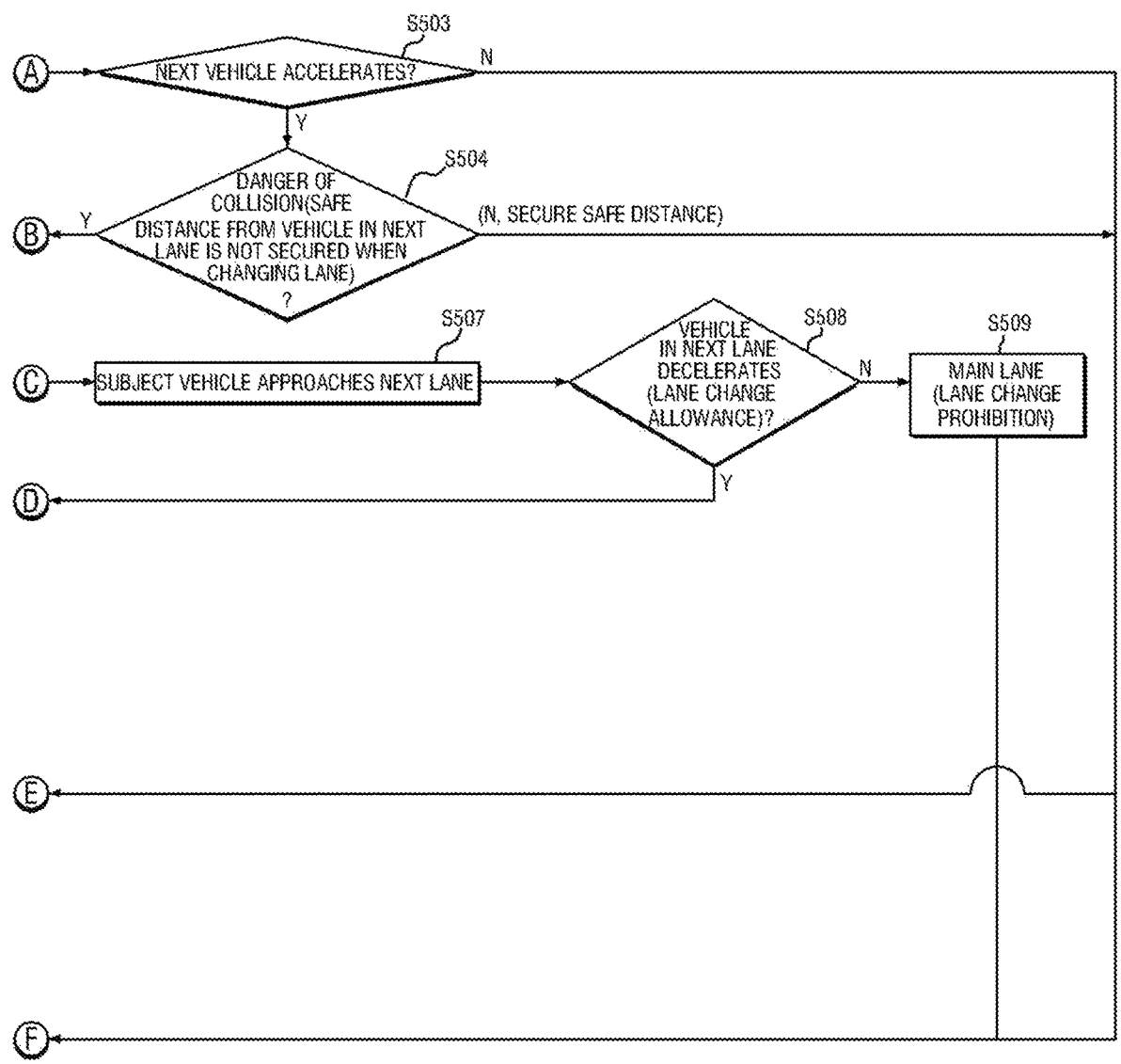

FIG. 5 is a flowchart illustrating a method of controlling an autonomous driving operation of a subject vehicle when the subject vehicle intends to change a lane according to another exemplary embodiment of the present disclosure, and hereinafter, each operation of control logic in the flowchart of FIG. 5 will be described in detail.

First, in response to determining that the subject vehicle requires a lane change in operation S501, whether distances between the subject vehicle and a front vehicle and a rear vehicle in a next lane are within a predetermined distance may be determined from information input to the radar/lidar/ultraviolet sensor, the camera, the navigation system, the IOT/V2V, and the like in operation S502. Herein, the distances between the subject vehicle and the front vehicle and the rear vehicle in a next lane refer to the distances in a lane direction. In response to determining that the distances between the subject vehicle and the front vehicle and the rear vehicle in a next lane are not within the predetermined distance, so that a safe distance is secured in operation S502, whether the vehicle in the next lane is accelerating may be determined in operation S503.

As a result of the determination in operation S503, when the vehicle in the next lane is not accelerating, the subject vehicle approaches the next lane in operation S513, and when the vehicle in the next lane is accelerating, whether there is a danger of collision, that is, whether a safe distance between the subject vehicle and the vehicle in the next lane is secured may be determined while the subject vehicle changes the lane in operation S504. As a result of the determination in operation S504, in response to determining that the safe distance is secured and there is no danger of collision, the subject vehicle approaches the next lane in operation S513, and in response to determining that there is a danger of collision, the subject vehicle may be configured to transmit a lane change intention signal to the vehicle in the next lane in operation S505.

After operation S505, whether the vehicle in the next lane transmits a lane change allowance signal, that is, whether the vehicle in the next lane decelerates may be determined in operation S506, and in response to determining that the vehicle in the next lane operates at a constant speed or accelerates, the subject vehicle approaches the next lane in operation S507, and then whether the vehicle in the next lane allows the change in the lane, that is, whether the vehicle in the next lane decelerates may be determined again in operation S508. As a result of the determination in operation S508, when the vehicle in the next lane does not decelerate, the subject vehicle may be configured to maintain the lane in operation S509, and when the vehicle in the next lane decelerates, whether the distances between the subject vehicle and the front vehicle and the rear vehicle in the next lane are within a predetermined distance may be determined in operation S510. Further, even in response to determining that the vehicle in the next lane decelerates in operation S506, whether the distances between the subject vehicle and the front vehicle and the rear vehicle in the next lane are within the predetermined distance may be determined in operation S510.

In response to determining that the distances between the subject vehicle and the front vehicle and the rear vehicle in the next lane are not within the predetermined distance in operation S510, the subject vehicle approaches the next lane in operation S513. In response to determining that the distances between the subject vehicle and the front vehicle and the rear vehicle in the next lane are within the predetermined distance in operation S510, the subject vehicle may be configured to transmit a lane change intention signal and a safe distance securing demanding signal in operation S511.

After operation S511, whether a safe distance is secured may be determined in operation S512, and when the safe distance is not secured, the subject vehicle may be configured to transmit the lane change intention signal and the safe distance securing demanding signal again in operation S511, and when the safe distance is secured, the subject vehicle approaches the next lane in operation S513. After the approach to the next lane, whether the safe distance is secured may be determined again in operation S514. When the safe distance is not secured, the subject vehicle may be configured to maintain the lane in operation S517 and transmit the lane change intention signal and the safe distance securing demanding signal again in operation S511, and when the safe distance is secured, the subject vehicle may be configured to change the lane in operation S515.

In the foregoing, the present disclosure has been described in detail with reference to the representative exemplary embodiment, but those skilled in the art may understand that the exemplary embodiment may be variously modified without departing from the scope of the present disclosure. Accordingly, the scope of the present disclosure shall not be defined while being limited to the aforementioned exemplary embodiment, but shall be defined by all of the changes or modified forms derived from the equivalent concepts to the claims, as well as the claims to be described below.

What is claimed is:

1. A system for controlling an operation of an autonomous vehicle, comprising:
    an information input unit configured to receive information regarding neighboring vehicles of the autonomous vehicle;
    an autonomous driving controller configured to:
        estimate a lane change intention of a first vehicle of the neighboring vehicles located in a next lane in a front direction of the autonomous vehicle from a signal received from the information input unit;
        determine whether to allow the first vehicle in the next lane in the front direction to change a lane based on acceleration and deceleration of the autonomous vehicle and whether a safe distance between the autonomous vehicle and the neighboring vehicles is secured; and
        generate an acceleration/deceleration control signal for adjusting a traveling speed of the autonomous vehicle; and
    a braking unit configured to distribute regenerative braking force and friction braking force of the autonomous vehicle according to the acceleration/deceleration control signal received from the autonomous driving controller to perform braking;
    wherein the autonomous driving controller is configured to output a lane change allowance or prohibition signal to the first vehicle located in the next lane in the front direction according to the allowance/disallowance of the change in the lane of the first vehicle in the next lane in the front direction;
    wherein, when the lane change intention of the first vehicle in the next lane in the front direction is estimated even though the lane change prohibition signal is output to the first vehicle in the next lane in the front direction, the autonomous driving controller is configured to generate a deceleration control signal to maximally perform regenerative braking while friction braking is performed at the same time as necessary;

wherein an approach of the vehicle in the next lane of the subject vehicle to the lane may be detected from camera information, and when a front-directional distance between the subject vehicle and the vehicle in the next lane is within a predetermined distance, regenerative braking may be operated, and when an interval between the subject vehicle and the vehicle in the next lane is less than the predetermine distance or the vehicle in the next lane decelerates, friction braking may be simultaneously operated for maintaining the interval between the vehicles.

2. The system of claim 1, wherein the information input unit is configured to receive information using one or more of Internet Of Things (IOT), Vehicle-to-Vehicle (V2V), a radar sensor, a lidar sensor, an ultraviolet sensor, a camera, and a navigation system.

3. The system of claim 1, wherein the braking unit is configured to calculate a deceleration according to a vehicle speed of the autonomous vehicle based on total brake force of regenerative braking force and friction braking force and distribute the regenerative braking force and the friction braking force of the autonomous vehicle.

4. A method of controlling an operation of an autonomous vehicle, comprising:
receiving, by a controller of an autonomous vehicle, information regarding neighboring vehicles;
estimating, by the controller, a lane change intention of a first vehicle of the neighboring vehicles located in a next lane in a front direction of the autonomous vehicle through the input information, determining whether to allow the first vehicle in the next lane in the front direction to change a lane based on acceleration and deceleration of the autonomous vehicle and whether a safe distance between the autonomous vehicle and the neighboring vehicles is secured, and generating an acceleration/deceleration control signal for adjusting a traveling speed of the autonomous vehicle; and
distributing, by the controller, regenerative braking force and friction braking force of the autonomous vehicle according to the acceleration/deceleration control signal to perform braking;
wherein a lane change allowance or prohibition signal is output to the first vehicle in the next lane in the front direction according to the allowance/disallowance of the change in the lane of the first vehicle in the next lane in the front direction;
wherein when the lane change intention of the first vehicle in the next lane in the front direction is estimated even though the lane change prohibition signal is output to the first vehicle in the next lane in the front direction, the generating of the acceleration/deceleration control signal includes generating a deceleration control signal to maximally perform regenerative braking while friction braking is performed at the same time as necessary;
wherein an approach of the vehicle in the next lane of the subject vehicle to the lane may be detected from camera information, and when a front-directional distance between the subject vehicle and the vehicle in the next lane is within a predetermined distance, regenerative braking may be operated, and when an interval between the subject vehicle and the vehicle in the next lane is less than the predetermine distance or the vehicle in the next lane decelerates, friction braking may be simultaneously operated for maintaining the interval between the vehicles.

5. The method of claim 4, wherein the receiving of the information includes receiving information using one or more of Internet Of Things (IOT), Vehicle-to-Vehicle (V2V), a radar sensor, a lidar sensor, an ultraviolet sensor, a camera, and a navigation system of the autonomous vehicle.

6. The method of claim 4, wherein the performing of the braking includes calculating a deceleration according to the maximum vehicle speed based on a total brake force of regenerative braking force and friction braking force and distributing the regenerative braking force and the friction braking force of the autonomous vehicle.

* * * * *